United States Patent [19]

Shimamoto

[11] Patent Number: 4,736,652

[45] Date of Patent: Apr. 12, 1988

[54] POWER TRANSMISSION DEVICE FOR AN AUTOMOBILE

[75] Inventor: Masao Shimamoto, Ikeda, Japan

[73] Assignee: Daihatsu Motor Company Limited, Osaka, Japan

[21] Appl. No.: 875,539

[22] Filed: Jun. 18, 1986

[30] Foreign Application Priority Data

Jun. 26, 1985 [JP] Japan .................. 60-139941

[51] Int. Cl.⁴ ............................................ F16H 37/02
[52] U.S. Cl. .................... 74/665 GE; 74/689
[58] Field of Search ............... 74/689, 665 GE, 674, 74/700, 701

[56] References Cited

U.S. PATENT DOCUMENTS

| | | | |
|---|---|---|---|
| 3,442,346 | 5/1969 | Winter et al. | 74/689 X |
| 4,294,137 | 10/1981 | Piret et al. | 74/665 EE X |
| 4,548,100 | 10/1985 | Hohn | 74/665 EE X |
| 4,608,885 | 9/1986 | Koivunen | 74/665 GE X |
| 4,624,153 | 11/1986 | Itoh et al. | 74/689 |

FOREIGN PATENT DOCUMENTS 227914   9/1959   Australia .................. 74/665 GE
1599957 10/1981 United Kingdom .

Primary Examiner—Lawrence Staab
Assistant Examiner—Harold F. Macris
Attorney, Agent, or Firm—Stevens, Davis, Miller & Mosher

[57] ABSTRACT

A power transmission device for an automobile, which is provided with a belt variable transmission and a direct coupling gear and capable of transmitting a power from a drive source to a differential gear selectively through the belt drive by the belt variable transmission or the direct coupling drive by the direct coupling gear, a counter gear engageable with an output shaft being provided on a counter shaft having a drive gear for transmitting the power to the differential gear so that the direct coupling gear engages with the counter gear to allow the gears during the direct coupling drive to engage with each other at two stages.

5 Claims, 2 Drawing Sheets

POWER TRANSMISSION DEVICE FOR AN AUTOMOBILE

FIELD OF THE INVENTION

The present invention relates to a power transmission device for an automobile, and more particularly to a power transmission device for an automobile, which transmits a power from a drive source to a differential gear and is provided with a V belt variable transmission.

BACKGROUND OF THE INVENTION

Conventionally, a power transmission device for an automobile has hitherto been proposed, which is provided with a V belt variable transmission comprising a driving pulley, a driven pulley and an endless V belt running across the driving and driven pulleys, so that each pulley changes its sheave diameter to change a transmission gear ratio in a stepless manner.

The belt variable transmission constructed as abovementioned is inferior in power transmission efficiency as compared to a usual gear transmission system.

In order to solve the above problem, for example, as disclosed in the Japanese Patent Laid-Open Gazette No. Sho 58-28,046, a power transmission device has been proposed which is provided between an input shaft connected to a drive source and an output shaft with a belt stepless variable transmission and a gear variable transmission disposed in parallel thereto so that the power is transmitted through the belt stepless variable transmission at the low stage speed change and through the gear transmission at the high stage speed change, thereby improving the power transmission efficiency at the high stage speed change for most running time so as to lengthen the life span of the belt.

The conventional gear transmission comprises a direct coupling driving gear provided in a fixed manner with respect to the input shaft, an idle gear engageable with the direct coupling driving gear, and a driven gear sleeved onto the output shaft and engageable with the idle gear. When the power is transmitted from the drive source to a differential gear through the gear transmission(hereinafter referred to as the direct coupling) the power from the input shaft is transmitted to the differential gear through the direct coupling driving gear, the idle gear, the driven gear, a main driving gear provided at the output shaft, and a counter driving gear.

Accordingly, power transmission by the direct coupling gear is carried out at four stages so that a power loss increases during the power transmission from the input shaft to the differential gear and the number of shafts and gears increases, thereby creating a problem in that the power transmission device is complicated in construction and of large size.

Meanwhile, the conventional power transmission device is provided on the output shaft with a forward gear and a reverse gear which are selectively coupled with the output shaft by a switching mechanism, the forward gear engaging with a forward only counter gear at a counter shaft disposed in parallel to the output shaft, the reverse gear engaging with a reverse only counter gear on the counter shaft through an idle gear on an idle shaft disposed in parallel to the output shaft.

Thus, on the counter shaft are provided the forward only counter gear and reverse only counter gear each of larger diameter, whereby these gears occupy a large space for arrangement and the entire device also is of large size.

Moreover, the number of teeth of the idle gear is irrelevant to a reduction ratio, so that the reduction ratio during the rearward running depends only on the number of teeth of the reverse gear and reverse only counter gear, thereby creating a problem in that a degree of freedom in design for setting the reduction ratio is restricted to that extent.

Also, the belt variable transmission will creat variation in the speed change ratio at the top speed due to variation in length of the belt or in axial length of a belt contact surface at each pulley, wear in the side surface of the belt with the lapse of time, or extension of the belt when subjected to a working load.

Hence, there are some cases where a speed change ratio during the direct coupling drive is lower than the speed change ratio at the top speed during the belt drive. In other words, the driving speed during the direct coupling drive is higher than the top speed during the belt drive. As a result, a problem is created in that, when the direct coupling drive is switched to the belt drive, a shock occurs.

SUMMARY OF THE INVENTION

A main object of the present invention is to provide a power transmission device for an automobile, which reduces the number of gear engaging stages during the direct coupling drive to thereby reduce the power loss and also reduces the number of shafts and gears, thereby being simple in construction and small-sized. Another object of the invention is to provide a power transmission device for an automobile, which further reduces the space needed for the gear arrangement and is freely settable in its reduction ratio during the rearward running regardless of the reverse gear and counter gear, thereby improving the degree of freedom in design. Still another object of the invention is to provide a power transmission device for an automobile, which can smoothly switch between the direct coupling drive and its belt drive .

The power transmission device for an automobile of the invention is provided with an input shaft for receiving the power from a drive source, an output shaft disposed in parallel to the input shaft and having an output gear, and a belt variable transmission interposed between the input shaft and the output shaft, thereby transmitting the power from the drive source to a differential gear, and characterized by providing a direct coupling gear on the input shaft, a switching mechanism for transmitting the power from the input shaft selectively to the belt variable transmission or the direct coupling gear, and a counter shaft which is disposed in parallel to the output shaft and has a driving gear for transmitting the power to the differential gear, and a counter gear provided on the counter shaft, so that the counter gear engages with the direct coupling gear and output gear.

Accordingly, the power transmission device of the present invention, which allows the direct coupling gear to engage directly with the counter gear engageable with the output gear, can transmit the power from the input shaft during the direct coupling drive to the differential gear through the direct coupling gear, counter gear and driving gear.

In other words, the direct coupling gear will transmit the power to the differential gear at two stages, so that a power loss is largely reducible in comparison with the conventional example, and moreover, the counter gear also engages with the output gear and is used for both the belt drive and direct coupling drive, so that the number of shafts and gears is reduced to a minimum in comparison with the conventional example, thereby enabling the power transmission device to be simple in construction and small-sized.

The power transmission device of the present invention is further provided with a forward gear, a reverse gear, a forward and reverse switching mechanism for connecting these gears selectively with the output shaft, and an idle shaft having a first idle gear and a second idle gear, the forward gear and second idle gear engaging with the counter gear at the counter shaft together with the direct coupling gear.

Thus, there is no need of providing at the idle shaft a forward only counter gear and a reverse only counter gear as the conventional, so that the space for disposing the gears is reduced to that extent, thereby enabling the device to be miniaturized, and the first and second idle gears can desirably set the reduction ratio when the automobile runs rearwardly, thereby improving the degree of the freedom in design to that extent.

In the above construction of the present invention, a speed change ratio when the direct coupling gear is selected, is set so that the speed of the direct coupling drive is lower than the top speed by the belt variable transmission, preferably the speed change ratio at the top speed by the belt variable transmission is made 0.8 to 1.0 times the speed change ratio during the direct coupling drive.

Hence, even when variation occurs in the speed change ratio at the top speed during the belt drive by the belt variable transmission, the belt drive and direct coupling drive are switched to each other smoothly without being subjected to a shock.

These and other objects, features and advantages of the invention will become more apparent upon a reading of the following detailed description and drawings.

DETAILED DESCRIPTION OF THE INVENTION

Figure 1:
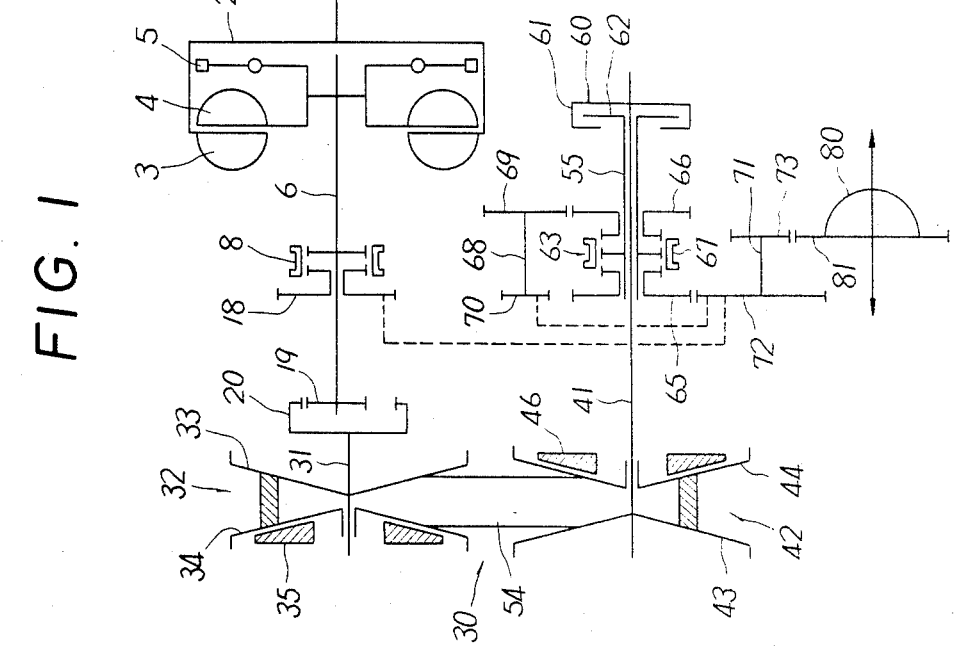
FIG. 1 is a skeleton diagram of an embodiment of a power transmission device of the invention.
Figure 3:
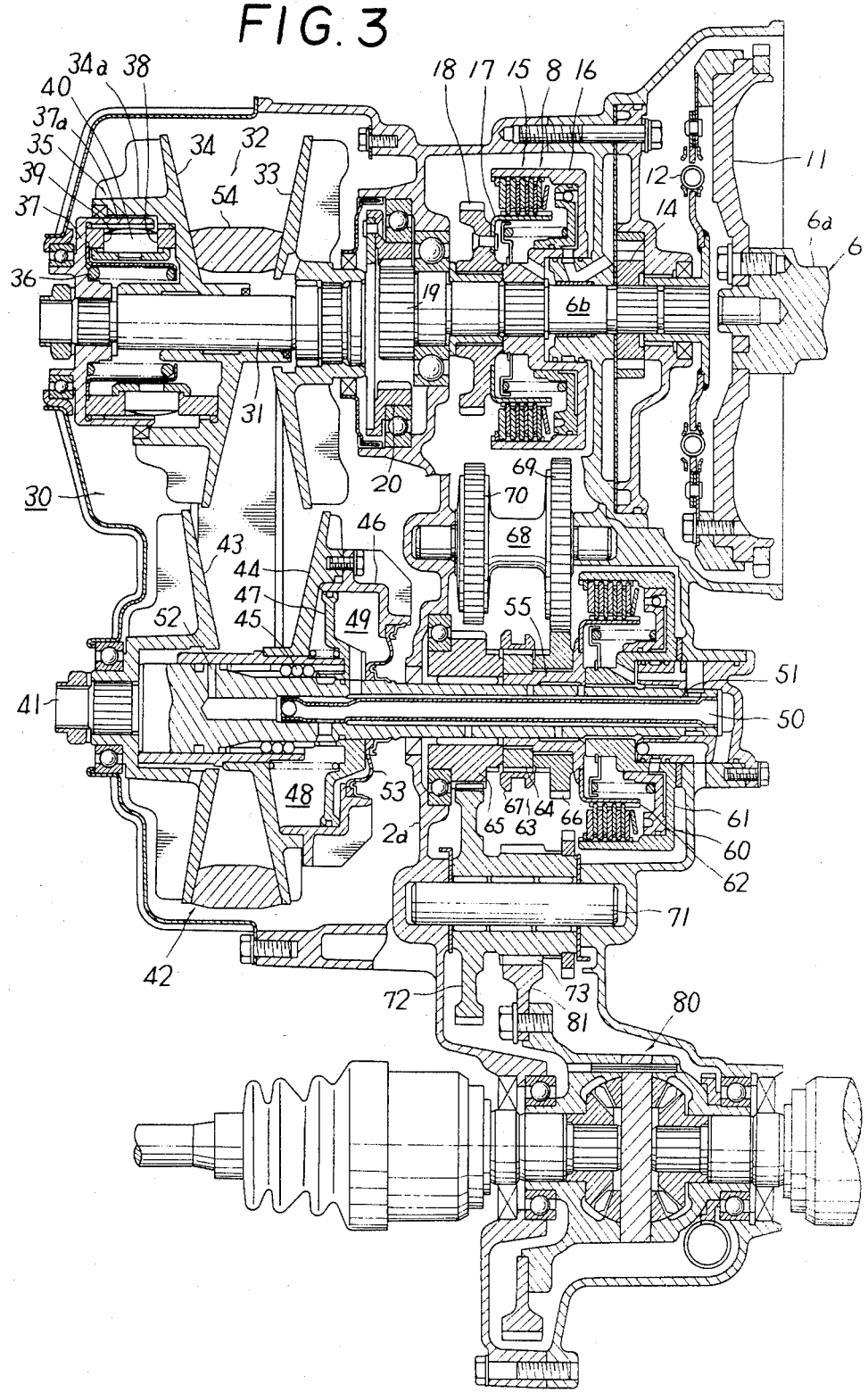
FIG. 3 is a developed sectional view showing the entire construction of the FIG. 1 embodiment modified in part.

FIG. 1 is a diagrammatic view of the embodiment of the invention for better understanding thereof and its concrete construction is shown in FIG. 3, from which a fluid coupling shown in FIG. 1 is omitted.

In FIG. 1, a fluid coupling cover 2 is connected to an end of a crank shaft 1 provided at a drive source usually comprising an internal combustion engine, the fluid coupling cover 2 containing therein a pump 3, a turbine 4 and a centrifugal lockup clutch means 5, mounted so as to be rotatable.

Hence, power from the crank shaft 1 is transmitted through the fluid coupling2 or the lockup clutch means 5 to an input shaft 6 coupled with the turbine 4.

The input shaft 6, as shown in FIG. 3, is cut at an intermediate portion so that a secondary input shaft 6b is coupled with a primary input shaft 6a through a flywheel 11 and a torsion damper 12.

An oil pump 14 driven by the secondary input shaft 6b is disposed thereon, a clutch drum 16 in a wet-type direct connection clutch means 15 is spline-connected with the input shaft 6b, and a clutch hub 17 at the clutch means 15 couples with a direct coupling gear 18 supported rotatably to the input shaft 6b.

The clutch means 15 constitutes a switching mechanism 8 for selectively transmitting the power from the input shaft 6b to the belt variable transmission or the direct coupling gear 18. Alternatively, the clutch means may use a dog clutch.

At the left end of the secondary input shaft 6b, an external gear 19 having at its outer periphery a number of teeth is formed integrally with the input shaft 6b, the external gear 19 engaging with an internal gear 20 fixed to a primary shaft 31 at a belt variable transmission 30 so that the power from the secondary input shaft 6b is decelerated to be transmitted to the primary shaft 31.

The belt variable transmission 30, as shown in detail in FIG. 3, comprises a driving pulley 32 provided at the primary shaft 31 at the driving side, a driven pulley 42 provided at an output shaft 41, and an endless V belt 54 of rubber or resin friction-driven across both the pulleys 32 and 42. The driving pulley 32 has a stationary conical disc 33 fixed to the driving shaft 31 and an axially movable conical disc 34, so that a torque cam means 35 for generating a thrust and a compression spring 36 are provided at the rear of the movable conical disc 34 to apply to the movable conical disc 34 the thrust necessary for torque transmission. The torque cam means 35 disposes a cam roller 40 rotatably between the opposite surfaces of the axially movable conical disc 34 and of a torque cam flange 37 fixed to the left end of the driving shaft 31, thereby generating the thrust in proportion to the input torque. The torque cam means 35 forms a space with a cylinder 34a projecting outwardly from and integrally with the axially movable conical disc 34 and a cylinder 37a projecting inwardly from and integrally with the torque cam flange 37, so that the cam roller 40 and a lubricant, such as grease, for reducing wearing on the cam roller 40 or the cam faces 38 and 39, are contained in the space.

The driven pulley 42 also has a stationary conical disc 43 fixed to the left end of the output shaft 41 and a movable conical disc 44 only axially movable through ball splines 45, the movable conical disc 44 fixedly supporting at the rear thereof a cylinder 46. A piston 47 fixed to the output shaft 41 is disposed at the inside of the cylinder 46 and partitions an oil pressure chamber 48 for controlling a speed change ratio from an auxiliary chamber 49 for offsetting a centrifugal oil pressure component generated in the oil pressure chamber 48. A working oil is fed or drained in or from the oil pressure chamber 48 through a working oil passage 50 provided at the axis of the output shaft 41 and the lubricating oil is fed or drained in or from the auxiliary chamber 49 through a lubricating oil passage 51 formed outside the working oil passage 50. The working oil having leaked through the ball splined 45 is returned to the lubricating oil passage 51 through an oil drain conduit 52 formed at the output shaft 41. In this case, since the auxiliary chamber 49 is shielded by a diaphragm 53 from the exterior, there is no fear of oil leakage to the exterior.

Thus, the working oil is fed in or drained from the oil pressure chamber 48 at the cylinder 46 to thereby actuate the movable conical disc 44. Hence, pulley diameters of the driven pulley 44 and also of the driving pulley 32 are varied to perform the stepless speed change.

A tubular shaft 55 is sleeved onto a right-hand end portion of the output shaft 41 and supports a hub 64 of a dog clutch constituting a forward and reverse switching mechanism 63, the tubular shaft 55 and output shaft 41 are adapted to be intermittent of contact therebetween through a rear clutch means 60.

The rear clutch means 60 engages when the switching mechanism 8 selects the belt variable transmission 30, and disengages when the same selects the direct coupling gear 18. Also, the rear clutch means 60, as shown in FIG. 3, is provided with a clutch drum 61 and a clutch hub 62, the clutch drum 61 being spline-coupled with the output shaft 41, the clutch hub 62 coupling with the tubular shaft 55.

A switching sleeve 67 is supported axially movably to the hub 64 at the dog clutch constituting the forward and reverse switching mechanism 63, a forward gear 65 and a reverse gear 66, which serve as the output gears, are disposed at both axial sides of the clutch hub 64, the forward gear 65 being supported rotatably to the output shaft 41, and the reverse gear 66 being supported rotatably onto the tubular shaft 55, so that the switching sleeve 67 is operated to couple the clutch hub 64 with the forward gear 65 or the reverse gear 66.

The clutch hub 62 at the rear clutch 60 and the hub 64 of the dog clutch, as shown in FIG. 3, are separate from the tubular shaft 55 and fixed thereto. Alternatively, the clutch hubs 62 and 64 may be fixed integrally to the tubular shaft 55.

Alternatively, the clutch drum instead of the clutch hub 62 may be fixed to or integral with the tubular shaft 55.

Alternatively, the tubular shaft 55, as shown in FIG. 1, may be axially extended and support also the forward gear 65.

Now, an idle shaft 68 extending in parallel to the output shaft 41 is disposed radially to one side of the output shaft 41 and fixedly supports at both its end portions a first idle gear 69 engageable with the reverse gear 66 and a second idle gear 70.

Figure 2:
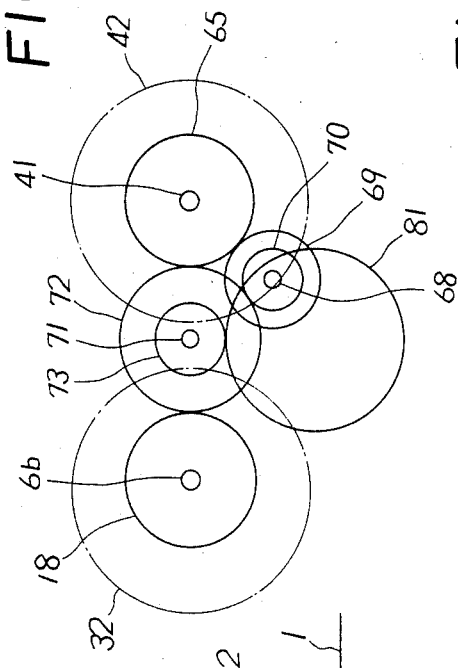
FIG. 2 is a diagrammatic side view showing the gear arrangement in the FIG. 1 embodiment.

Meanwhile, as shown in FIG. 2, between the output shaft 41 and the secondary input shaft 6b is disposed a counter shaft 71 extending in parallel to both the shafts 41 and 6b, and a counter gear 72 and a drive gear 73 engageable with a ring gear 81 of a differential gear 80 are fixed to the counter shaft 71, the counter gear 72 being shown in the dotted line in FIG. 1. Also, the counter gear 72, direct coupling gear 18, forward gear 65 and second idle gear 70 engage simultaneously with each other as shown in FIG. 2.

Since the counter gear 72 engages with the direct coupling gear 18 as well as the forward gear 65, the power of the input shaft 6 during the direct coupling drive can be transmitted to the differential gear 80 through the direct coupling gear 18 and counter gear 72, whereby the gear engagement at two stages is enough for the direct coupling drive to largely avoid a power loss. Moreover, since the counter gear 72 is usable for both the belt drive and direct coupling drive, the number of gears and shafts is reducible, whereby the power transmission device of the invention is simple in construction and small-sized.

In this embodiment, the second idle gear 70 for going in reverse and provided at the idle shaft 68 also engages with the counter gear 72, whereby the larger diameter reverse only counter gear may be omitted as described in the conventional example. Hence, the gear arrangement space is reducible and the power transmission device can be miniaturized.

Also, the first and second idle gear 69 and 70 provided on the idle shaft 68 enable the two-stage speed reduction, thereby improving the degree of freedom in the design because a desired reduction ratio during the rearward running is obtained regardless of the reverse gear 69 and counter gear 72.

Next, explanation will be given on operation of the power transmission device of the invention.

Firstly, the belt drive is used in the low stage speed charge for the forward drive. In this case, the switching mechanism 8 separates the direct coupling gear 18 from the input shaft 6b and the rear clutch means 60 engages to transmit the power from the output shaft 41 to the tubular shaft 55.

Accordingly, the power of the input shaft 6 is transmitted to the differential gear 80 through the belt variable transmission 30, output shaft 41, forward gear (output gear) 65, counter gear 72 and drive gear 73, thereby forwardly driving the automobile in the stepless speed change because the input shaft 6 and differential gear 80 rotate in the same direction.

When the automobile is rearwardly driven, the switching mechanism 8 separates the direct coupling gear 18 from the input shaft 6b, the rear clutch 60 engages, and the forward and reverse switching mechanism 63 couples the tubular shaft 55 with the reverse gear 66, so that the power from the input shaft 6 is transmitted to the differential gear 80 through the belt variable transmission 30, output shaft 41, reverse gear 66, first and second reverse idle gears 69 and 70, counter gear 72 and drive gear 73, thereby enabling the automobile to be rearwardly driven because the input shaft 6 and differential gear 80 rotate in the reverse direction to each other.

Meanwhile, in the high stage speed change during the forward drive, the direct drive is used. In this case, the switching mechanism 8 couples the input shaft 6b with the direct coupling gear 18 and the rear clutch 60 disengages, thereby transmitting the power from the input shaft 6 to the differential gear 80 through the direct coupling gear 18, counter gear 72 and drive gear 73. Hence, the input shaft 6 and differential gear 80 rotate in the same direction and the direct coupling drive is performed not through the belt variable transmission but by the gears only, thereby greatly improving the transmission efficiency. Moreover, since the direct coupling gear 18 on the input shaft 6, counter gear 72 on the counter shaft 71 and drive gear 73 are merely interposed between the input shaft 6 and the differential gear 80, the gears engage with each other at the two stages, thereby reducing the power loss to a minimum. Furthermore, since the counter gear 72 is used for both the belt drive and direct coupling drive, the smallest number of gears is enough to use, thereby enabling the power transmission device to be simple in construction and of small size.

In the aforesaid construction, it is preferred that, the speed change ratio of the direct coupling gear 18 to the counter gear 72 is set so that the speed of direct coupling drive through the direct coupling gear 18 is lower than the top speed during the belt drive through the belt variable transmission 30.

Actually, the speed change ratio at the top speed when in the belt drive is made 0.8 to 1.0 times the speed change ratio in the direct coupling drive.

In other words, when the number of teeth of the direct coupling gear 18 is represented by $Z_1$, that of the counter gear 72 by $Z_2$, a reduction ratio of the external gear 19 to the internal gear 20 for the primary shaft 31 at the belt variable transmission 30 to the input shaft 6b by $i_1$, the speed change ratio at the top speed of the belt variable transmission 30 by $i_2$, and a reduction ratio of the output shaft 41 to the counter shaft 71 by $i_3$, the following expression is obtained:

$$K \cdot \frac{Z_2}{Z_1} = i_1 \cdot i_2 \cdot i_3$$

where K=0.8 to 1.0.

In the above expression, $Z_2/Z_1$ in the left side represents the speed change ratio during the direct coupling drive and the right side: the speed change ratio at the top speed during the belt drive.

Figure 4:
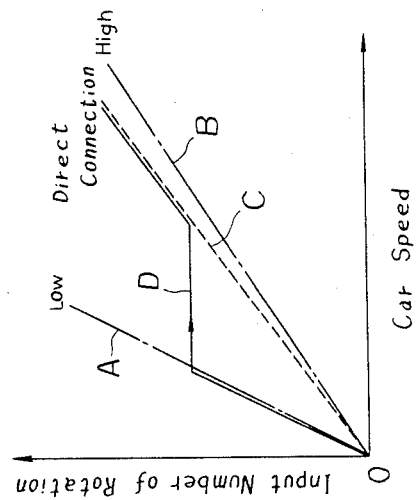
FIG. 4 is a chart showing the relation of the speed change ratio between the direct coupling drive and the belt drive.

Next, explanation will be given on the aforesaid construction in accordance with the speed change diagram in FIG. 4, in which a line A shows the lowest speed, that B shows the top speed and that C shows the speed change during the direct coupling drive, the line C being positioned somewhat lower than the line B. For example, when the automobile is accelerated at a certain degree of opening of its throttle, the acceleration, as shown by the line D, is carried out along the lowest speed line A, and when the input number of rotations (or the number of engine rotations) reaches a predetermined value, the speed change is carried out while holding the above number of rotations, then the belt drive is switched to the direct coupling drive when the speed change ratio by the belt drive coincides with that by the direct coupling drive, and thereafter the acceleration is performed along the direct coupling drive line C. Since the line C is positioned somewhat lower than the line B, even when variation is created in the speed change ratio $i_2$ at the top speed by the belt variable transmission 30, the belt drive is switched smoothly to the direct coupling drive or vice versa.

In addition, the reason for specifying K to be 0.8 to 1.0 is that a metal belt is less in variation in the speed change ratio at the top speed so that K of 0.9 or more is experimentally allowable, but a rubber belt or a resin belt is larger in variation in the same so that K must be 0.8 or more from the result of experiments. Even when K is 0.8 or less, no shock occurs when the direct coupling drive and belt drive are switched from one to the other, but the speed is low during the direct coupling drive and the fuel expense will increase during the high speed running in high frequency, which is not preferable for a driver.

While an embodiment of the invention has been shown and described, the invention is not limited to the specific construction thereof, which is merely exemplary in the specification rather than defined.

What is claimed is:

1. A power transmission device for an automobile, which transmits power from a drive source to a differential gear, comprising;
   an input shaft for receiving the power from said drive source;
   an output shaft disposed in parallel to said input shaft and provided with an output gear;
   a belt variable transmission including a drive pulley and a driven pulley interposed between said input shaft and said output shaft and means to vary the pulley diameters;
   a direct coupling gear provided on said input shaft so as to transmit the power from said input shaft to said differential gear but not through said belt variable transmission;
   a switching mechanism for transmitting the power from said input shaft selectively to one of said belt variable transmission and direct coupling gear and driving it;
   a counter shaft disposed in parallel to said output shaft and having a first drive gear and a second drive gear for transmitting therethrough the power to said differential gear;
   said output shaft being provided with : a clutch means which engages when said belt variable transmission is selected and disengages when said direct coupling gear is selected; a forward gear; a reverse gear and a forward and reverse switching mechanism for connecting said forward and reverse gears selectively to said output shaft;
   an idle shaft having a first idle gear engageable with said reverse gear and second idle gear;
   said first drive gear being directly engageable with said direct couple gear, said forward gear, and second idle gear.

2. A power transmission device for an automobile as set forth in claim 1, wherein said output shaft is provided with a tubular shaft, between said output shaft and said tubular shaft with said clutch means engaging when said belt variable transmission is selected and disengaging when said direct coupling gear is selected, said tubular shaft supporting said reverse gear and said forward and reverse switching mechanism which selectively connects said forward and reverse gears with said output shaft.

3. A power transmission device for an automobile as set forth in claim 2, wherein said clutch means is provided with a hub and a drum, said forward and reverse switching mechanism is provided with a dog clutch having a hub, said hub of said dog clutch and one of said hub and drum of said clutch means are formed integrally with said tubular shaft, and the other of said hub and drum of said clutch means is formed integrally with said output shaft.

4. A power transmission device for an automobile as set forth in claim 1, wherein a speed change ratio, when said direct coupling gear is selected, is so set that the speed of said direct coupling drive through said direct coupling gear is lower than the top speed during the belt drive through said belt variable transmission.

5. A power transmission device for an automobile as set forth in claim 4, wherein the speed change ratio at the top speed during the belt drive through said belt variable transmission is made 0.8 to 1.0 times the speed change ratio during the direct coupling drive through said direct coupling gear.

* * * * *